US009135067B2

(12) United States Patent
Chandra

(10) Patent No.: US 9,135,067 B2
(45) Date of Patent: Sep. 15, 2015

(54) RESOURCE SHARING USING PROCESS DELAY

(71) Applicant: MIPS Technologies, Inc., Sunnyvale, CA (US)

(72) Inventor: Debasish Chandra, Fremont, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 210 days.

(21) Appl. No.: 13/780,197

(22) Filed: Feb. 28, 2013

(65) Prior Publication Data

US 2014/0245317 A1    Aug. 28, 2014

(51) Int. Cl.
*G06F 9/46* (2006.01)
*G06F 9/50* (2006.01)

(52) U.S. Cl.
CPC ........................................ *G06F 9/50* (2013.01)

(58) Field of Classification Search
None
See application file for complete search history.

(56) References Cited

U.S. PATENT DOCUMENTS

| 7,155,718 | B1* | 12/2006 | Joffe .............................. | 718/102 |
| 2003/0191927 | A1* | 10/2003 | Joy et al. ....................... | 712/228 |
| 2005/0188184 | A1* | 8/2005 | Senter et al. .................. | 712/225 |
| 2005/0283783 | A1* | 12/2005 | DeSota ......................... | 718/100 |
| 2008/0082794 | A1* | 4/2008 | Yu et al. ........................ | 712/218 |
| 2008/0313438 | A1* | 12/2008 | Luick ............................ | 712/222 |
| 2010/0131958 | A1* | 5/2010 | Cazorla Almeida .......... | 718/104 |
| 2010/0299499 | A1* | 11/2010 | Golla et al. ................... | 712/206 |

* cited by examiner

*Primary Examiner* — Emerson Puente
*Assistant Examiner* — Dong Kim
(74) *Attorney, Agent, or Firm* — Sterne, Kessler, Goldstein & Fox P.L.L.C.

(57) ABSTRACT

Methods and systems that reduce the number of instance of a shared resource needed for a processor to perform an operation and/or execute a process without impacting function are provided. a method of processing in a processor is provided. Aspects include determining that an operation to be performed by the processor will require the use of a shared resource. A command can be issued to cause a second operation to not use the shared resources N cycles later. The shared resource can then be used for a first aspect of the operation at cycle X and then used for a second aspect of the operation at cycle X+N. The second operation may be rescheduled according to embodiments.

20 Claims, 7 Drawing Sheets

RESOURCE SHARING USING PROCESS DELAY

BACKGROUND

1. Field of the Invention

The invention generally relates to microprocessors and is of particular relevance to out of order processes with resources that are shared by multiple operations or processes.

2. Related Art

In such a scheme, various processors might share a resource by dividing its use temporally; a first process might be entrusted with a resource (by, e.g., a scheduler) at a first clock cycle and a second process might be entrusted with use of the resource at a later clock cycle. From time to time, a situation may arise when a process and/or operation requires multiple instances of a shared resource. Previously, the best way to address this situation has been by either adding additional instances of the shared resource to address this worst case scenario and/or changing the scheduling scheme in ways that negatively impacted processor function.

BRIEF SUMMARY OF THE INVENTION

What is needed, therefore, are systems and methods that allow a process and/or operation to use multiple instances of a shared resource, but that do not require additional physical instances of the shared resource and that do not negatively impact processor function. According to embodiments, a method of processing in a processor is provided. The method may include determining that an operation to be performed by the processor will require the use of a shared resource. A command can be issued to cause a second operation to not use the shared resources N cycles later for a predetermined duration (e.g., 1 or more cycles). The shared resource can then be used for a first aspect of the operation at cycle X and then used for a second aspect of the operation at cycle X+N. The second operation may be rescheduled according to embodiments.

According to embodiments, a processor is also provided. The processor may comprise a shared resource, a scheduler, and a processing component. The shared resource may be configured to be used by a number of operations during different processor, cycles. The scheduler may be configured to determine that a first operation will require the use of the shared resource and cause a second operation to not use the shared resource N cycles later for a predetermined duration (e.g., 1 or more cycles). The processing component may be configured to perform a first aspect of the first operation at a cycle X and to perform a second aspect of the first operation at cycle X+N.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
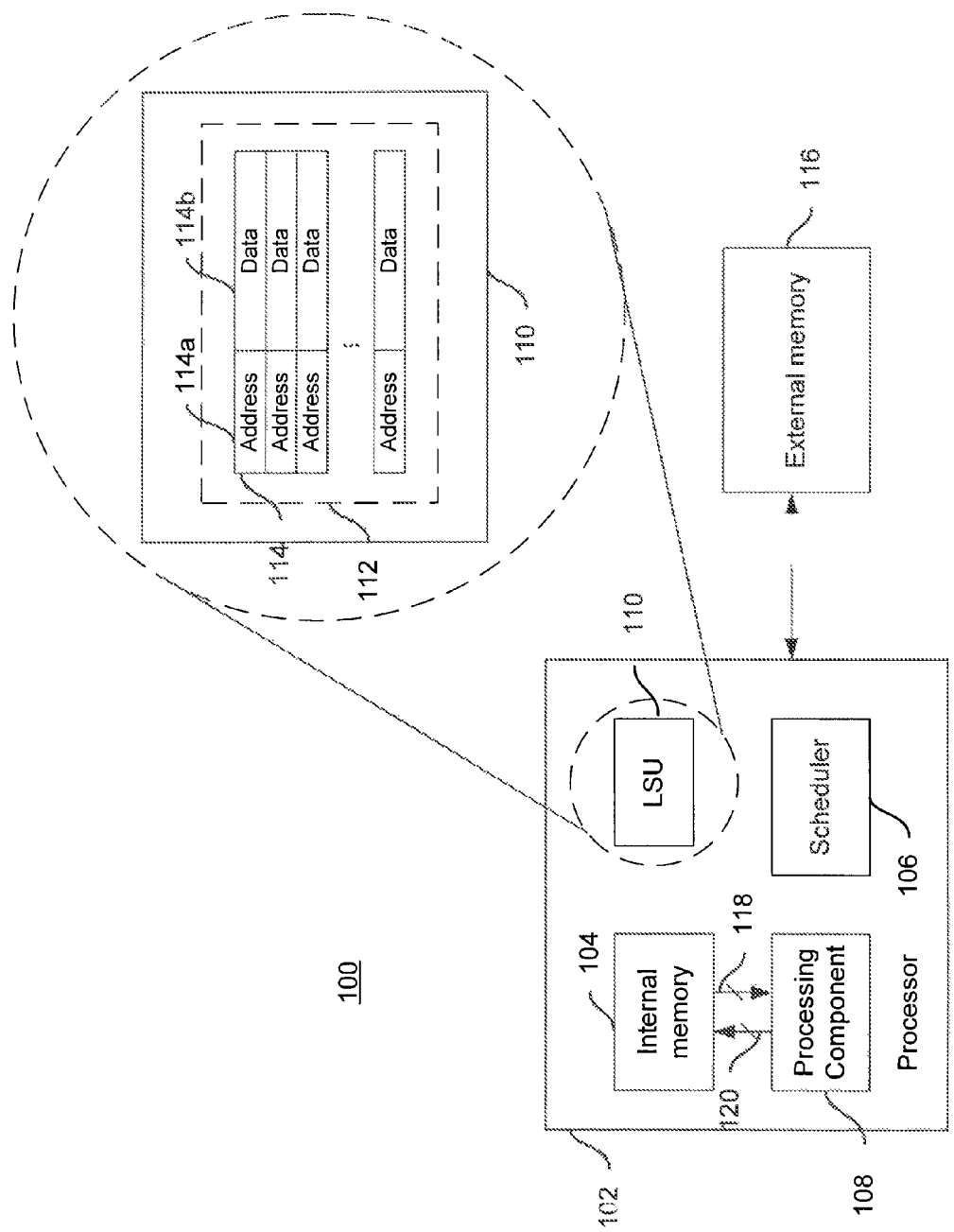
FIG. 1 is a functional block diagram depicting components of a system according to various embodiments of the disclosure.

Features and advantages of the invention will become more apparent from the detailed description of embodiments of the invention set forth below when taken in conjunction with the drawings in which like reference characters identify corresponding elements throughout. In the drawings, like reference numbers generally indicate identical, functionally similar, and/or structurally similar elements. The drawings in which an, element first appears is indicated by the leftmost digit(s) in the corresponding reference number.

DETAILED DESCRIPTION

The following detailed description of embodiments of the invention refers to the accompanying drawings that illustrate exemplary embodiments. Embodiments described herein relate to a low power multiprocessor. Other embodiments are possible, and modifications can be made to the embodiments within the spirit and scope of this description. Therefore, the detailed description is not meant to limit the embodiments described below.

It should be apparent to one of skill in the relevant art that the embodiments described below can implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

FIG. 1 is a functional block diagram depicting aspects of a computer system 100. The computer system may comprise a processor 102 and an external memory 116. The processor 102 may include an internal memory 104 (e.g., a register or cache), a scheduler 106, a processing component 108, and a load/store unit 110.

Internal memory 104 may include any suitable computer readable media. For instance, the internal memory may include one or more memory sub-systems (e.g., caches, registers, etc.) store data for use by processor 102. Internal memory 104 may consist of a cache or one or more memory data registers configured to store data for use by processor 102 when performing operations. Additionally, internal memory 104 may include one or more caches, or more memory address registers, designed to store an address associated with the data to be used by the processor. Internal memory 104 may also include a number of read ports 118 to allow read access to internal memory 104 by processor 102 and a number of write ports 120 to allow write access to memory 104.

Scheduler 106 may include one or more circuits and/or software to determine which of a number of processes or operations are to be executed or used by a resource at a given time. For instance, when a process or operation completes, scheduler 106 may decide which ready process or operation may next access a shared resource or be executed by processing component 108. Scheduler 106 may also facilitate data multiplexing, or the transmission of multiple data flows at the same time.

The load/store unit (LSU) 110 is responsible for handing load and store instructions to read and/or write data from internal memory 104 or external memory 116. According to various embodiments, LSU 110 may include a load/store queue (LSQ) 112. LSQ 112 may contain a number of values for a particular class of instructions, such as load instructions, store instruction, memory access instructions, etc. As shown in FIG. 1, LSQ 112 contains, for instance, a number of entries 114, each of which has an address component 114a and a data component 114b. Additional components could be added to the entries 114 without changing the spirit or the scope of this disclosure.

External memory 116 may consist of any number of suitable computer-readable storage media arranged in one or more subsystems. External memory 116 may also include volatile or non-volatile memory or any memory capable of storing instructions and/or data. External memory 116 may include, for example, random access memory and/or read-only memory.

Figure 2:
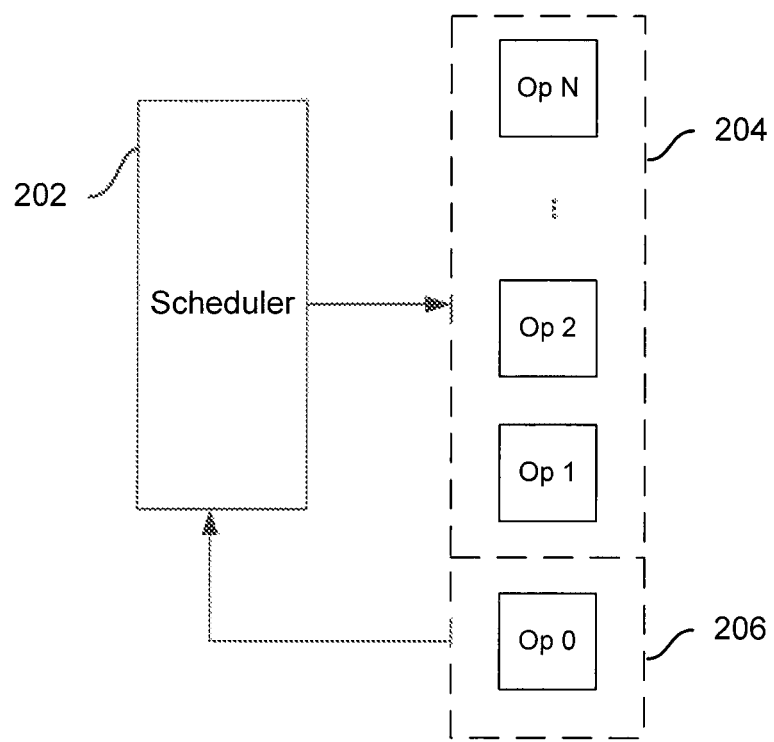
FIG. 2 is a functional block diagram depicting the function of a scheduler according to various embodiments of the disclosure.

FIG. 2 contains a functional block diagram 200 that depicts how a scheduler 202 functions according to various embodiments. As shown in FIG. 2, scheduler 202 may be responsible for determining which of a number of processes or operations (e.g., processes Op 0 to Op N) are executed by processing component 108 and/or able to use a shared resource (e.g., internal memory 104) at any given time. Scheduler 202 may communicate with ready operations (e.g., Op 1 to Op N) in a ready queue 204 and one or more active operations (e.g., Op 0) in as active state 206. For instance, when the active operation Op 0 is finished with its execution and/or use of a resource (e.g., the read/write ports of the registers in the internal memory 104), scheduler 202 may determine which of the remaining processes (Op 1 to Op N) in ready queue 204 should be executed and/or allowed to next use the shared resource. Additionally, scheduler 202 may be configured to receive an indication from an active process 206 that requires the use of multiple instances of a shared resource. In such cases, scheduler 202 may modify and/or delay the scheduling of subsequent processes in response. How the scheduler 202 can be so configured is best described by way of example. We will describe this functionality with respect to a store operation (STO) performed by processor 102. However, it should be understood that a number of different operations may benefit from the functionality described within the scope and spirit of the disclosure.

For the purpose of our example, assume that processor 102 has a load/store architecture. Processors with this kind of architecture only allow memory access by use of load and store operations. In such an architecture, all the values required for a given operation need to be loaded from memory (e.g., external memory 116) into internal memory 104 prior to the operation. After the performance of a given operation, the result can then be stored back in external memory 116.

To perform the store operation (STO) at least two pieces of information are required: the data to be stored and an address where the data is to be stored. Further, a STO can be thought of as having two aspects: a store address aspect and a store data aspect. While it is possible to use a single operation to perform both aspects (i.e., storing the data and address in LSQ 112), splitting, or "cracking" the store into separate store address (STA) and store data (STD) operations has been found to be more efficient in many cases. This is because the address where the data is to be stored is frequently known well in advance of the data and can, therefore, be written to LSQ 112 in advance of the data that is written when it becomes available. However, this scheme can sometimes be problematic. For instance, if a load command for the address in question were to come before the data was ready, the incorrect data would be delivered despite the fact that the address information was correct. In such instances, the store functionality must be implemented as a single, "un-cracked" operation in order to assure that the address and data are both valid at the same time, or at least within a finite number of cycles of each other.

Performing both the store address and store data aspects of the store operation at the same time can also be problematic. For example, this problem is best illustrated by explaining the steps that have to occur in order to store the address and to store the data.

Figure 3:
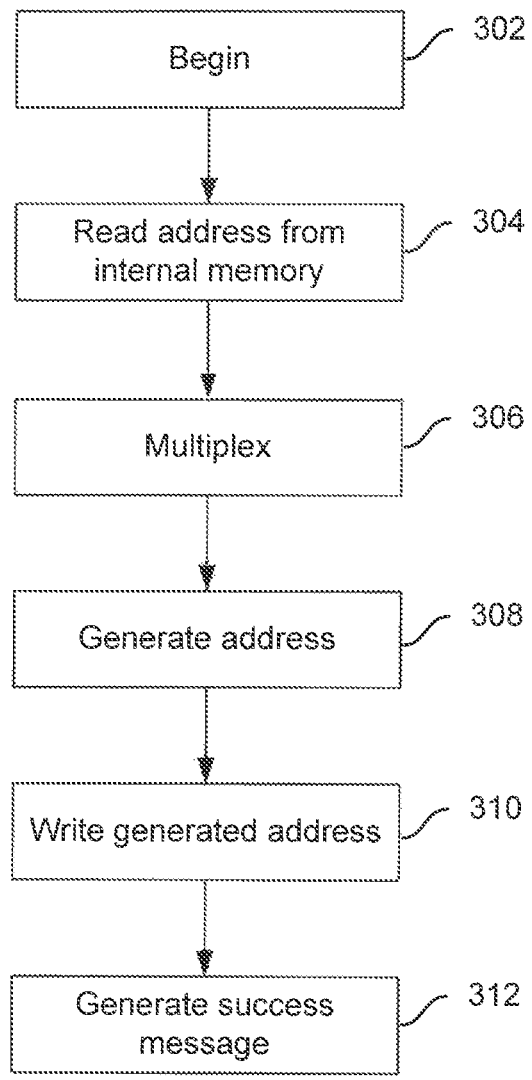
FIG. 3 is a flowchart depicting a method of storing an address according to various embodiments of the disclosure.

FIG. 3 is a flowchart depicting method 300 of performing the STA aspect of a STO operation, according to various embodiments. Reference will be made to FIG. 1, however it should be appreciated that the method described in FIG. 3 is more generally applicable than the specific embodiment depicted in FIG. 1.

The STA operation begins at step 302. The STA operation may begin because it is chosen by scheduler 106.

Before any of the subsequent steps can occur, the address to be stored needs to be read from internal memory (e.g., memory 104) at step 304. The address data may be read by performing a memory read access using one or mote read ports from internal memory 104. According to some embodiments, the address stored in and read from the internal memory may not consist of an actual physical memory address to a memory, but instead consist of a virtual memory address.

At step 306, the data flow from the internal memory can be multiplexed to "catch" the data. This step is necessary according to some embodiments to facilitate multitasking. Accordingly, scheduler 106 may be in charge of multiplexing multiple data flows from internal memory 104.

At step 308, a physical address in external memory 116 is generated from the virtual memory address retrieved from the internal memory 104 at step 304. (This step is not necessary if the retrieved address is an actual physical address.) According to various embodiments, the physical address may be generated using a table lookaside buffer (TLB), a standard look-up table (LUT), or any other suitable means. The TLB or LUT may be stored in internal memory 104 or may be in separate structures within processor 102.

At step 310, the address can be written to the appropriate place for storage in external memory. For instance, according to some embodiments, this may take the form of writing the generated physical address to the address portion 114a of an entry 114 of LSQ 112. A success message can then be generated at step 312.

Figure 4:
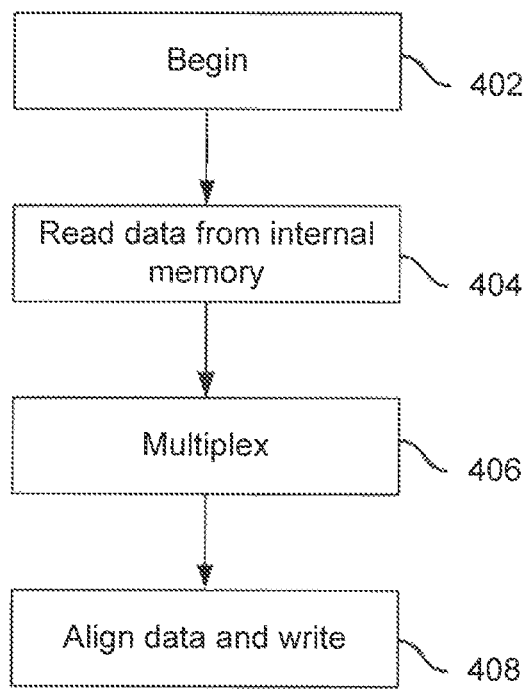
FIG. 4 is a flowchart depicting a method of storing data according to various embodiments of the disclosure.

FIG. 4 is a flowchart depicting the method 400 of performing the store data (STD) aspect of a store operation according to various embodiments. Reference will be made to FIG. 1, however, like with the discussion of FIG. 3, it should be appreciated that the method described in FIG. 4 is more generally applicable than the specific embodiment depicted in FIG. 1.

As can be seen in FIG. 4, the operation to store the data can begins at step 402. Similarly to the STA operation, none of the subsequent steps can be performed until the data can be read from internal register 104 (e.g., a register file or the like) at step 404.

At step 406, the data may be multiplexed to "catch" the data. This step is necessary according to some embodiments to facilitate multitasking. Accordingly, the scheduler 106 may be in charge of multiplexing multiple data flows from internal memory 104.

At step 408, the data can be aligned to the appropriate format and then written to the appropriate place so that it will eventually be placed in the external memory 116 where it belongs. According to various embodiments, the data can be written to the data portion 114b of an entry 114 in the LSQ 112.

Figure 5:
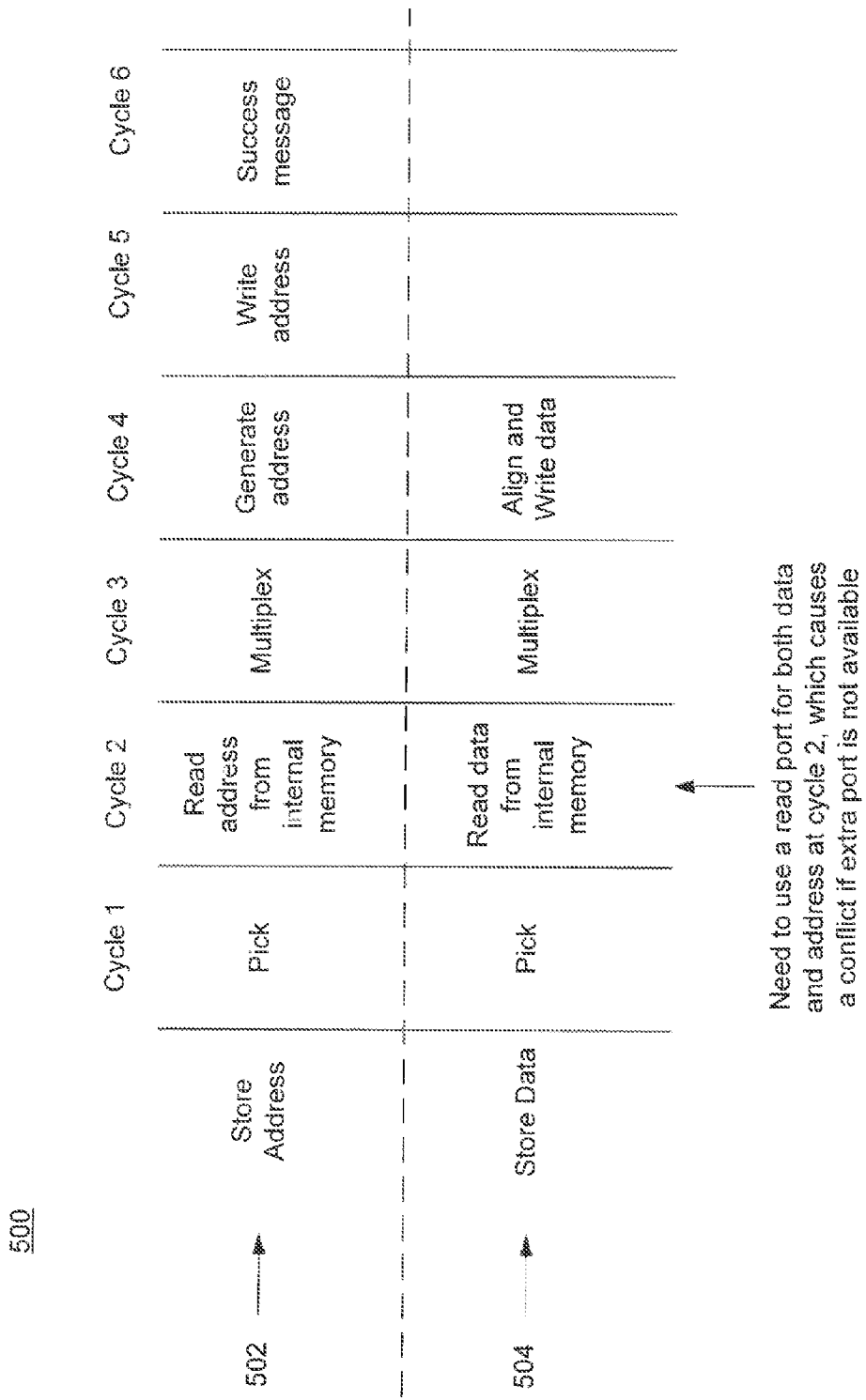
FIG. 5 is a chart depicting the operation of data storage and address storage according, to various embodiments of the disclosure.

FIG. 5 depicts a scenario 500 where the store address (STA) aspect 502 of the STO operation and the store data (STD) 504 aspect of operation STO are performed at the same time. Specifically, FIG. 5 depicts what the aspects 502 and 504 must perform at each cycle.

At cycle 1, both aspects 502 and 504 of the STO operation are picked by, e.g., scheduler 106 and can begin performing the necessary steps. During cycle 2, each of the STA aspect 502 and the STD aspect 504 must read data from internal memory 104. As discussed above with respect to method 300, the STA aspect 502 must read the address associated with the data to be stored (e.g., process step 304). Similarly, as discussed above with reference to method 400, the STD aspect must read the data to be stored from internal, memory 104 (i.e., step 404) prior to performing the rest of its steps.

Because both of STA aspect 502 and STD aspect 504 access internal memory 104 during cycle 2 in scenario 500, internal memory 104 must have enough read ports to accommodate both read accesses. For instance, if both the address read and the data read required a single read port, then internal memory 104 would have to have at least 2 read ports in order to avoid a conflict under scenario 500.

During cycle 3, both STA aspect 502 and STD aspect 504 can multiplex the data read from internal memory 104 to "catch" the data. This step is necessary according to some embodiments to facilitate multitasking. Accordingly, scheduler 106 may be in charge of multiplexing multiple data flows from internal memory 104.

During cycle 4, STA aspect 502 generates a physical address for the data to be stored from the virtual memory address retrieved from internal memory 104 during cycle 3 (i.e., step 304). According to various embodiments, the physical address may be generated using a table lookaside buffer (TLB), a standard look-up table (LUT), or any other suitable means. The TLB or LUT may be stored in internal memory 104 or may be separate structures within processor 102. Additionally, during cycle 4, the data can be aligned to the appropriate format and then written to the appropriate place so that it will eventually be placed in external memory 116 where it belongs. According to various embodiments, the data can be written to data portion 114b of an entry 114 in LSQ 112.

During cycle 5, the address of STA aspect 502 can be written to the appropriate place for storage in external memory 116. For instance, according to some embodiments, this may take the form of writing the generated physical address to the address portion 114a of an entry 114 of LSQ 112. No action is taken during cycle 5 by STD aspect 504 because it has completed.

During cycle 6, a success message is generated at step 312. The success message indicates that the data to be stored was successfully found in internal memory 104 and placed in LSQ 112.

Figure 6:
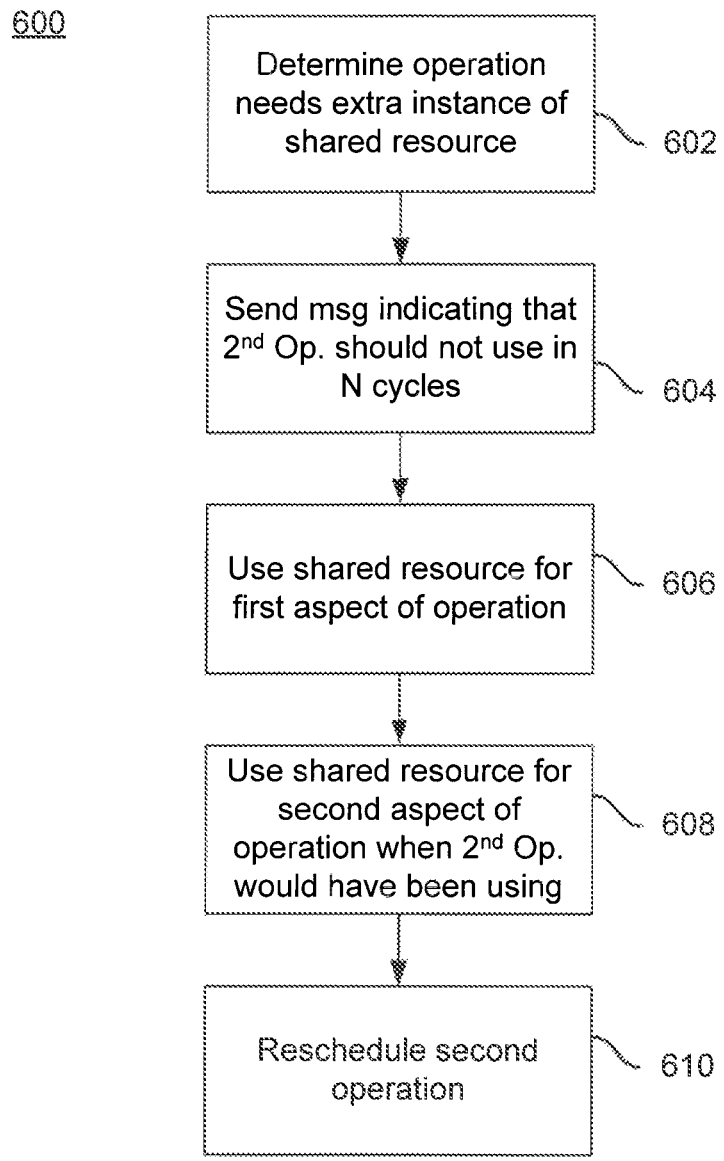
FIG. 6 is a flowchart depicting a method of sharing a resource according to various embodiments of the disclosure.

As discussed above, scenario 500 allows simultaneous completion of both STA aspect 502 and STD aspect 504 of the STO operation. However, because both address and data are read from internal memory 104 during the same cycle, internal memory 104 must have a sufficient number of ports for both read accesses. However, it is frequently desirable to reduce the number of instances of resources such as read ports, provided it can be done without negatively impacting the function of system 100. FIG. 6 depicts a method 600 of performing both aspects of the STO operation simultaneously that does not require internal memory 104 to have as many ports as required for scenario 500.

As shown in FIG. 6, at step 602, the method 600 determines whether an additional shared resource is required to perform a given operation. For instance, using our example above, with the store operation, the method might determine that the operation is the combined store STO operation, which will require the use of an additional port for internal memory 104.

At step 604, a second operation is delayed from using the shared resource until at least N cycles has elapsed. This could take the form of sending a message to a scheduler, which then can delay the second operation appropriately. This allows the first operation to use the shared resource (e.g., the read port of internal memory 104 in our example) at a time when it would otherwise be in use by the second operation. According to various embodiments, the delay of the second operation occurs N cycles after the issuance of a command or message indicating that a delay is necessary. For instance, if the message issued at cycle X, then the delay would not occur until cycle X+N. According to various embodiments, the command may be configured to take fewer than N cycles to communicate. For instance, if N=2, then the command would need to take only a single cycle to communicate so that the second operation can be stopped from using the shared resource on the next cycle.

At step 606 the first aspect of the first operation that requires use of the shared resource can use the shared resource. Following along with our example, this might take the form of the port of internal memory 104 being used to read the virtual address from internal memory 104.

At step 608, the shared resource can be used by the second aspect of the operation. For instance, according to our STO example, the data to be stored could be read from internal memory 104 using the memory port at step 608. As noted above, this will take place at the time when the second operation would have otherwise been using the shared resource.

At step 610, the second operation can be rescheduled as appropriate. For instance, according to some embodiments, the second operation could simply be allowed to use the shared resource on the cycle following the use of the resource by the first operation (e.g., cycle X+N+1) and all of the other waiting operations could be similarly delayed by the appropriate number of cycles. Alternatively, the second operation could simply be rescheduled to use the shared resource at the next opportunity without rescheduling any of the other waiting operations or could be put at the end of the ready queue 204.

Figure 7:
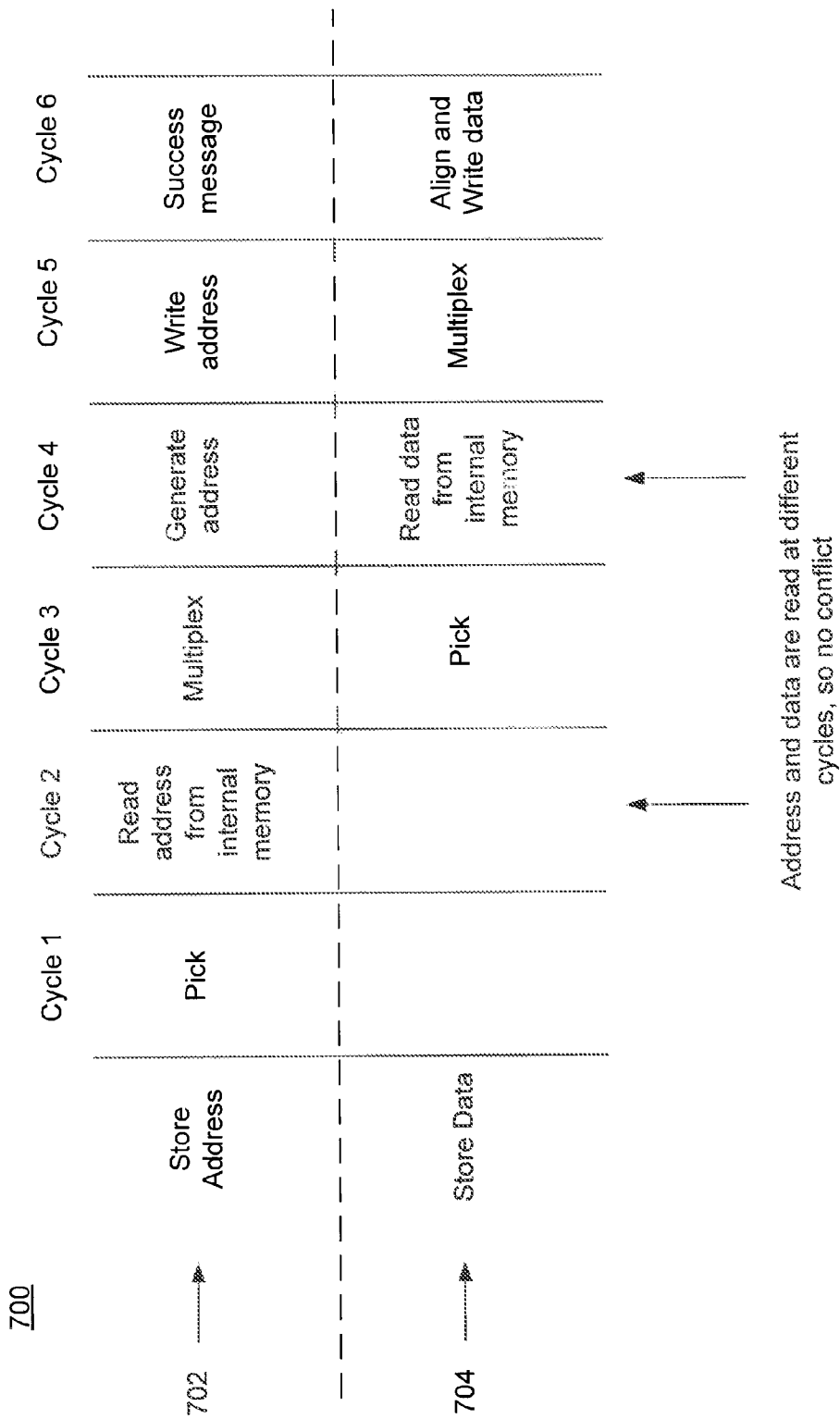
FIG. 7 is a chart depicting the operation of data storage and address storage according to various embodiments of the disclosure.

FIG. 7 is a diagram 700 highlighting the advantage of following method 600. Diagram 700 depicts STA aspect 702 of the STO operation and STD aspect 704 of the STO operation at various processor cycles.

As can be seen in FIG. 7, the STA aspect 702 can begin at cycle 1. As noted above, before any of the subsequent steps for STA aspect occur, the address to be stored needs to be read from internal memory 104 (i.e., step 304 from method 300). This occurs at cycle 2, as shown in FIG. 7. The data may be read by performing a memory read access using one or more read ports from internal memory 104. According to some embodiments, the address stored in and read from internal memory 104 may not include an actual physical memory address to a memory, but instead include a virtual memory address. STD aspect 704 has yet to begin during cycles 1 and 2. Accordingly, internal memory 104 need not have sufficient ports to handle read access for both the address and the data in order to avoid a conflict, as was the case in the scenario depicted in FIG. 5.

At cycle 3, STD aspect 704 can begin. Additionally, at cycle 3, the address data from the store address aspect can be multiplexed (i.e., step 306 of method 300) to "catch" the data. This step is necessary according to some embodiments to facilitate multitasking. Accordingly, scheduler 106 may be in charge of multiplexing multiple data flows from internal memory 104.

At cycle 4, STD aspect 704 is fee to use the shared resource (e.g., the read ports of internal memory 104 in this example) at cycle 4 because STA aspect 702 has already used the shared resource and, as discussed above with reference to FIG. 6, any other operation that was previously scheduled to use the port during that cycle has been prevented from doing so (see step 604) thereby freeing the port for use by the STD aspect 704. During cycle 4, STA aspect 702 may generate a physical address from the virtual address it read from internal memory 104 during cycle 2 (e.g., step 308 of method 300).

At cycle 5, address aspect 702 may write the address value to the appropriate place for storage in external memory 116. For instance, according to some embodiments, this may take the form of writing the generated physical address to the address portion 114a of an entry 114 of LSQ 112.

At cycle 6, STD aspect 704 can align the data to the appropriate format and then write it to the appropriate place so that it will eventually be placed in the external memory 116 where it belongs (e.g., step 408 from method 400). According to various embodiments, the data can be written to the data portion 114b of an entry 114 in the LSQ 112. Additionally, at cycle 6, the a success message may be relayed indicating that the data to be stored was successfully found in internal memory 104 and placed in LSQ 112.

Like the scenario 500 depicted in FIG. 5, scenario 700 depicted in FIG. 7 completes in 6 cycles. However, unlike scenario 500, scenario 700 does not require sufficient instances of the shared resource (e.g., the read ports) to accommodate both a read address access and a read data access during the same cycle. That is, scenario 700 (employing method 600) ends in the same result after the same number of cycles, but requires fewer instances of the shared resource.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in any known non-transitory computer usable medium including semiconductor, magnetic disk, optical disk (e.g., CD-ROM, DVD-ROM, etc.).

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination, of hardware and software. Thus, the present invention should not be limited by any of the above-described exemplary embodiments, but should be defined only in accordance with the following claims and their equivalence. It will be appreciated that embodiments using a combination of hardware and software may be implemented or facilitated by or in cooperation with hardware components enabling the functionality of the various software routines, modules, elements, or instructions, e.g., the components noted above with respect to FIG. 1.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method of processing in a computer system, comprising:
    determining that a first operation and a second operation will require the use of a shared resource;
    issuing a command configured to cause restriction of access to the shared resource for the second operation at an Nth cycle after a cycle X;
    using the shared resource for a first aspect of the first operation at cycle X;
    scheduling the second aspect of the first operation to use the shared resource at cycle X+N, wherein cycle X+N is a time when the second operation would have otherwise been scheduled to use the shared resource; and
    re-scheduling the second operation to use the shared resource at a next opportunity without rescheduling other waiting operations,
    wherein X and N are positive integers.

2. The method of claim 1, wherein re-scheduling the second operation comprises allowing the second operation to use the shared resource immediately following the use of the shared resource by the second aspect of the first operation.

3. The method of claim 1, wherein the first operation comprises a store operation requiring that both an address and data be read from an internal memory.

4. The method of claim 3, wherein the first aspect of the first operation comprises reading an address from the internal memory.

5. The method of claim 3, wherein the second aspect of the first operation comprises reading data from the internal memory.

6. The method of claim 3, further comprising writing the address to a load/store queue.

7. The method of claim 3, further comprising writing the data to a load/store queue.

8. The method of claim 1, wherein the shared resource is a read port of internal memory.

9. The method of claim 1, wherein the command is communicated in fewer than N cycles.

10. The method of claim 1, wherein N is greater than or equal to 2 cycles.

11. A processor, comprising:
a shared resource configured to be used by a plurality of operations during different processor cycles;
a scheduler configured to:
determine that a first operation will require the use of a shared resource and to cause restriction of access to the shared resource for the second operation at an Nth cycle after a cycle X, and
reschedule the second operation to use the shared resource at a next opportunity without rescheduling other waiting operations; and
a processing component configured to:
perform a first aspect of the first operation at cycle X, and
perform a second aspect of the first operation at cycle X+N, wherein cycle X+N is a time when the second operation would have otherwise been scheduled to use the shared resource,
wherein X and N are positive integers.

12. The processor of claim 11, wherein the scheduler is configured to reschedule the second operation by allowing the second operation to use the shared resource immediately following the use of the shared resource by the second aspect of the first operation.

13. The processor of claim 11, wherein the first operation comprises a store operation requiring that both an address and data be read from an internal memory.

14. The processor of claim 13, wherein the processing component is configured to read an address from the internal memory as the first aspect of the first operation.

15. The processor of claim 13, wherein the processing component is configured to read data from the internal memory as the second aspect of the first operation.

16. The processor of claim 13, wherein the processing component is configured to write the address to a load/store queue.

17. The processor of claim 13, wherein the processing component is configured to write the data to a load/store queue.

18. The processor of claim 11, wherein the shared resource is a read port of an internal memory.

19. The processor of claim 18, wherein the internal memory comprises a register file and/or a cache.

20. The processor of claim 11, wherein the N is greater than or equal to 2 cycles.

* * * * *